June 23, 1970     I. V. AINSWORTH     3,516,162
DENTAL MATRIX EQUIPMENT
Filed May 26, 1969
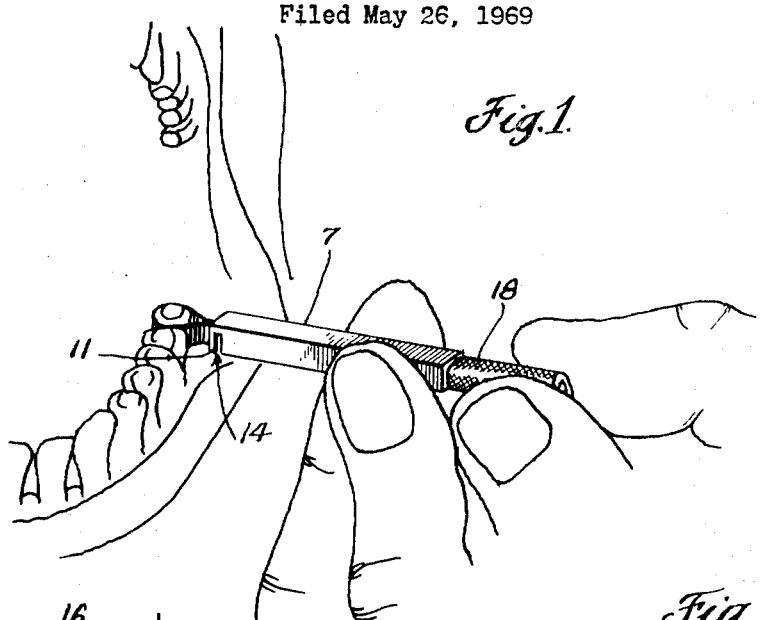
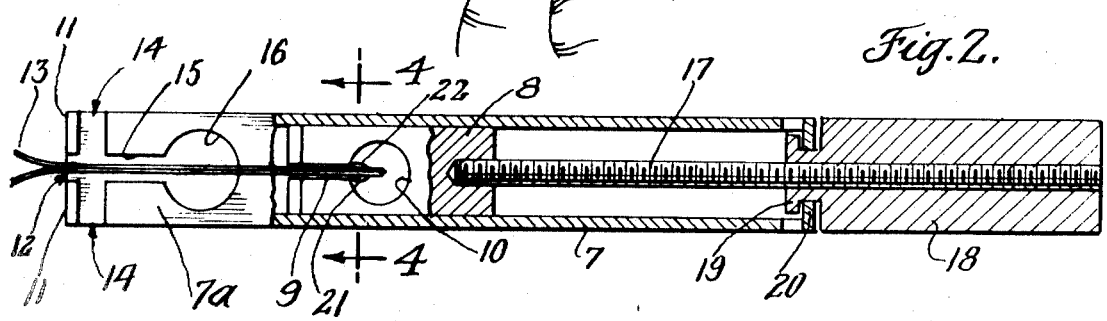
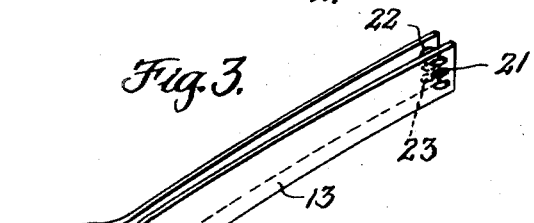
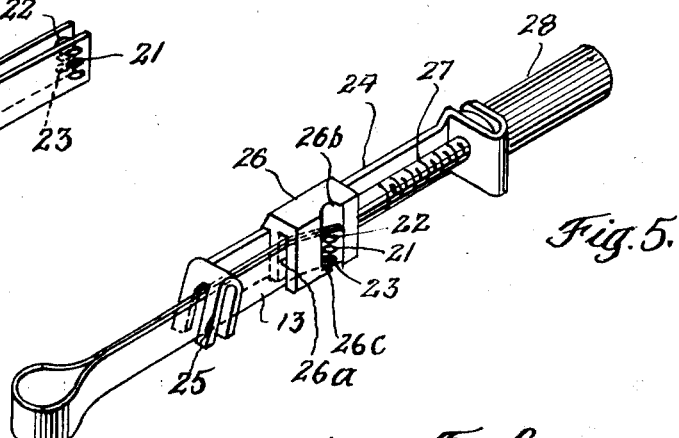
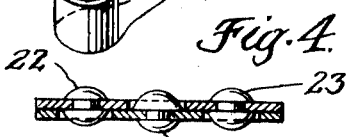
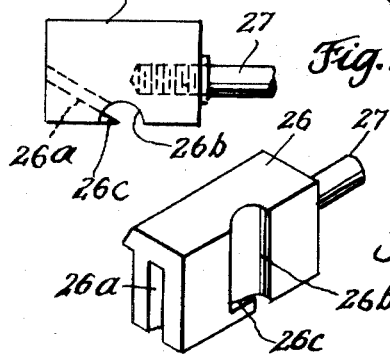
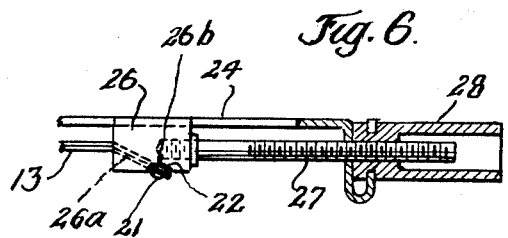
INVENTOR
IRA V. AINSWORTH.
BY
ATTORNEYS United States Patent Office 3,516,162
Patented June 23, 1970

3,516,162
DENTAL MATRIX EQUIPMENT
Ira V. Ainsworth, 3009 Titanic St.,
El Paso, Tex. 79904
Continuation-in-part of application Ser. No. 701,810,
Jan. 16, 1968. This application May 26, 1969, Ser.
No. 827,538
Int. Cl. A61c 5/12
U.S. Cl. 32—63
9 Claims

ABSTRACT OF THE DISCLOSURE

Dental matrix equipment including a strip type matrix band having apertures in the end portions thereof, with lugs or rivets extended through the apertures and projecting at opposite side faces of the band to provide means for interlocking with a band tightening retainer device, and band retainers adapted for use with bands having such projecting lugs.

The present application is a continuation-in-part of my prior application Ser. No. 701,810, filed Jan. 16, 1968, and issued Aug. 26, 1969, as Pat. No. 3,462,841.

In the above-identified prior application there is disclosed dental matrix equipment including a retainer having a sliding block with a slot therein for receiving the end portions of a matrix band in the form of a strip, the end portions of the band having enlargements fitting in a recess provided in the sliding block, so that the ends of the band will not slip out of the block when the block is moved to tighten the band around a tooth.

In the form shown in said prior application, the enlargements provided at the ends of the band take the form of thickened band parts or rod-like elements lying in the plane of the band and extended from one edge to the other. Although such enlargements are effective for the purpose of interlocking with a band tightening block such enlargements require special fabrication techniques, with consequent increase in the cost of the bands.

One of the principal objects of the present invention is to provide a band having projections near the ends thereof for interlocking with a band tightening block, which projections are capable of being formed in a very simple and inexpensive manner and which also have certain other advantages, as will be pointed out more fully hereinafter. Briefly, the enlargements provided at the ends of the band according to the present invention take the form of lugs or rivets which are extended through apertures provided in the end portions of the band, and which lugs project from the opposite side faces of the band in both directions. Each end of the band is provided with one or more apertures with which one or more lugs on the other end of the band cooperate in a manner tending to maintain the ends of the band in a desired predetermined relation to each other.

The invention also contemplates a novel form of equipment adapted to be used in association with a band of the kind above referred to.

How the foregoing objects and advantages are attained will appear more fully from the following description referring to the accompanying drawings, in which:

FIG. 1 is a view showing dental matrix equipment in use, this view showing the form of retainer disclosed in my copending application above identified;

FIG. 2 is a longitudinal sectional view through the retainer shown in FIG. 1 and further showing the improved form of matrix band associated with the retainer;

FIG. 3 is an isometric view of a band constructed according to the present invention;

FIG. 4 is a transverse sectional view through the end portions of the band, taken as indicated by the line 4—4 on FIG. 2;

FIG. 5 is an isometric view of an alternative form of retainer with which the band of the present invention is also adapted to be used;

FIG. 6 is a longitudinal sectional view through a portion of the retainer of FIG. 5, indicating further the manner of associating one of the matrix bands with this form of retainer;

FIG. 7 is a plan view of the band fastening block used in the embodiment of FIGS. 5 and 6, but showing the block on an enlarged scale; and FIG. 8 is an isometric view of the block shown in FIG. 7.

Referring first to the embodiment of FIGS. 1–4 inclusive, the retainer comprises an elongated body or frame structure 7, being here shown as tubular and of square cross section. A square block 8 is slidably mounted within the body 7 and this block is provided with a slot 9 with one end presented toward one end of the body 7 and with the other end communicating with a recess or aperture 10 within the block. At the left end of the body 7, as viewed in FIGS. 1 and 2, a pair of guides 11 are provided, serving to define a slot 12 therebetween into which portions of a band 13 may be inserted edgewise. If desired the band 13 may alternatively be inserted into one or the other of the slots 14—14 at opposite sides of the body, so that a band loop may be positioned laterally of the body, instead of at the end of the body, according to the position in the mouth in which the retainer is to be used.

Adjacent the slots 12, 14 and 14 the wall 7a of the tubular body 7 is provided with a slot 15 and an aperture 16 adapted to register with the slot 9 and aperture 10 of the block 8 when the block is shifted to its extreme left hand position as viewed in FIG. 2. In this position, the ends of the band may readily be inserted edgewise into the slot 9 and recess 10 of the block 8.

Shifting or sliding movement of the block 8 is effected by screw and nut elements indicated at 17 and 18. The screw 17 is rigidly fixed in the block 8 and the cooperating nut element 18 desirably takes the form of a knurled knob adapted for convenient rotation by the fingers. The nut is rotative with respect to the body 7 but is restrained as against axial motion by the interfitting parts 19 and 20 on the nut and body 7, as will be readily apparent from FIG. 2.

The band 13 illustrated in the drawings is a straight band, but it is to be understood that the bands may be of a variety of shapes, one shape quite widely used being somewhat boomerang shaped, i.e., having end portions interconnected with each other in somewhat angled relation, as is well known in this art. From reference to the drawings, especially to FIG. 4, it will be seen that each end of the band is provided with three apertures. One end has an aperture in which a rivet or lug 21 is mounted, while the other end of the band is provided with a pair of apertures in which rivets 22 and 23 are mounted. In addition to the apertures in which the rivets are mounted, the first end of the band has two somewhat larger apertures adapted to receive the projecting portions of the rivets 23, while the second end of the band contains an enlarged aperture adapted to receive the projecting end of the rivet 21, the pattern of this arrangement being clear from FIG. 4. The rivet associated with the first end of the band is centered widthwise of the band and the rivets 22 and 23 are offset from the center line of the band, so that when the two ends of the bands are brought into positions adjacent to each other, the lugs on the respective ends of the band interdigitate and project into the enlarged apertures in the other end of the band. This is not only of importance in order to avoid interference of a lug on one end of the band with a lug on the other end of the band, but also aids in maintaining proper relative positioning of the ends of the band inserted into the slotted block.

The band of the invention may be made of any of several different materials, preferably stainless steel, and the lugs or rivets may be formed of stainless steel, copper or aluminum.

The foregoing arrangement provides an exceedingly simple and inexpensive technique for providing enlargements at the ends of a band adapted to interlock with a band tightening block.

The improved band of the present invention is also adapted for use with other forms of retainers. Indeed, the provision of the lugs at the ends of the band makes possible simplification of ceratin types of retainers heretofore extensively used, but which were heretofore constructed to cooperate with bands having plain ends by the use of a pinch screw adapted to fasten the band to the band tightening block. Such prior art pinch screw arrangements have been disadvantageous in that they result in frequent damage to the bands, so that the bands must be discarded and replaced much more frequently than would otherwise be required.

A modified form of retainer with which the band of the present invention is also well adapted for use is shown in FIGS. 5 and 6. Here it will be seen that the retainer comprises a body or frame structure 24 in the form of a metal strip having at one end a slotted guide device 25 through which the ends of a band are adapted to be inserted either from the end of the retainer or from the side thereof, according to the position in the mouth in which the band loop is to be used. As seen in FIGS. 5–8, a block 26 is mounted for sliding movement on the frame or body strip 24 by spaced guideways embracing and interfitting with the strip, and this block is provided with a diagonal slot 26a having one end open toward the slotted guide 25 and having its other end opening into a recess 26b formed in a side of the block, as clearly appears in FIGS. 7 and 8. The block 26 is adapted to be moved by cooperating screw and nut elements 27 and 28, the screw 27 being rigidly fixed in the block 26, as with the screw 17 in the first embodiment. The nut 27 again takes the form of a knurled manually rotatable member which is mounted on the body of the retainer with freedom for rotation but which is restricted as against axial motion, in the same general manner as described above with reference to the first embodiment.

The ends of the band positioned in side-by-side relation in the manner indicated in FIG. 4 are adapted to be inserted edgewise into the slot 26a, with the interfitting lugs 21, 22 and 23 received in recess 26b. Desirably, when the ends of the band are initially inserted into the slot the rivets are positioned outside of the plane of the block and thus just outside of the recess 26b, and after insertion, the entire band is then shifted in the direction to place the rivets within the recess 26b, and at that time the projecting finger 26c underlies the lower edges of the end portions of the band, and thus prevents edgewise dislodgement of the end portions from the slot 26a.

The foregoing arrangement, including the projecting finger 26c, aids in keeping the band in the desired position at the time when the band loop is being placed around a tooth in order to serve its function as a matrix band.

The retainer of FIGS. 5 and 6 is thus also adapted for use with a band having enlargements at its ends, and this modification therefore also avoids the necessity of employing a pinch screw for gripping flat ends of a band, with consequent frequent damage to the bands.

It will be understood that any desired number of rivets or lugs may be provided at the ends of the band, but it is preferred to provide an arrangement in which the lugs at one end are staggered with relation to the lugs at the other end in order to provide for interdigitating of the lugs.

I claim:
1. Dental matrix equipment comprising an elongated body or frame structure having a slotted guide at the end thereof for guiding a matrix band when tightened around a tooth, a block mounted on the body structure, the body structure having guide means providing for sliding movement of the block lengthwise of the body structure and the block having a slotted portion for receiving the end portions of a matrix band, a matrix band in the form of a strip having apertures through its end portions, lugs in said apertures and projecting from the strip transversely thereof, the end portions of the band being positioned in side-by-side relation in the slotted portion of the block with the intermediate portion of the band extended from one end of the slotted portion of the block through the slotted guide at the end of the body structure and with the lugs positioned beyond the other end of the slotted portion of the block and thereby provide for tightening of the band around a tooth upon sliding of the block away from the slotted guide at the end of the body structure, and relatively rotatable nut and screw elements for sliding the block with respect to the body structure, one of said elements being fixed to the block as against axial movement and the other being fixed to the body structure as against axial movement and one of said elements having an exposed manually rotatable portion providing upon rotation for sliding of the block with respect to the body structure.

2. Dental matrix equipment as defined in claim 1 in which the screw element is fixed in the block non-rotatively and also as against axial motion and in which the nut element is manually rotatable and is fixed as against axial motion with respect to the body structure.

3. Dental matrix equipment as defined in claim 1 in which the lugs in the apertures in the respective end portions of the band are staggered with respect to each other widthwise of the band and thereby interdigitate when the end portions of the band are brought together in side-by-side relations.

4. Dental matrix equipment comprising an elongated body or frame structure having a slotted guide at the end thereof for guiding a matrix band when tightened around a tooth, a block mounted on the body structure, the body structure having guide means providing for sliding movement of the block lengthwise of the body structure and the block having a band receiving slot therein with one end presented toward the slotted guide at the end of the body structure and the slot being extended diagonally therefrom and having its other end offset to one side of the center of the block, a matrix band in the form of a strip having laterally projecting lugs at the end portions thereof, the end portions of the band being positioned in side-by-side relation in the slot in the block with the intermediate portion of the band extended from the slot through the slotted guide at the end of the body structure and with lugs at the end portions of the band projecting from the end of the slot offset toward a side of the block and thereby provide for tightening of the band around a tooth upon sliding of the block away from the slotted guide at the end of the body structure, and cooperating relatively rotatable screw and nut elements for sliding the block with respect to the body structure, the screw element being fixedly secured in the block in spaced relation to the slot, and the nut element being manually rotatable and fixed with respect to the body structure as against axial movement to thereby provide for sliding movement of the block with respect to the body structure and thus for tightening of the band around a tooth when the nut is rotated.

5. A dental matrix band for use with a matrix band retainer having a slotted band tightening block, the band being in the form of a strip having apertures through its end portions and having lugs fixed in said apertures and extended transversely through the strip with the ends of the lugs projecting at opposite side faces of the strip and thereby provide for interlocking with a band tightening block when the ends of the band are positioned in side-by-side relation in the slot of the block.

6. A dental matrix band as defined in claim 5 in which the lugs in the apertures in the respective end portions of the band are staggered with respect to each other widthwise of the band and thereby interdigitate when the end portions of the band are brought together in side-by-side relation.

7. A dental matrix band as defined in claim 6 in which at least one aperture is provided in each end of the band in position to receive a lug projecting from the other end of the band.

8. A dental matrix band for use with a matrix band retainer having a slotted band tightening block, the band being in the form of a strip having an aperture through each end portion thereof and having a lug fixed in one of said apertures and extended transversely through the strip, with the ends of the lug projecting at opposite side faces of the strip and thereby provide for interlocking with a band tightening block when the ends of the band are positioned in side-by-side relation and extended through the slot of the block with a projecting portion of the lug engaged in the aperture in the other end portion of the strip.

9. Dental matrix equipment comprising an elongated body or frame structure having a slotted guide at the end thereof for guiding a matrix band when tightened around a tooth, a block mounted on the body structure, the body structure having guide means providing for sliding movement of the block lengthwise of the body structure and the block having a slotted portion for receiving the end portions of a matrix band, a matrix band in the form of a strip having an aperture through each end portion, a lug in one of said apertures and projecting from the strip transversely thereof, the end portions of the band being positioned in side-by-side relation in the slotted portion of the block with a projecting portion of the lug engaged in the aperture in the other end portion of the band, with the intermediate portion of the band extended from one end of the slotted portion of the block through the slotted guide at the end of the body structure and with the interengaged lug and aperture positioned beyond the other end of the slotted portion of the block, and thereby provide for tightening of the band around a tooth upon sliding of the block away from the slotted guide at the end of the body structure, and relatively rotatable nut and screw elements for sliding the block with respect to the body structure, one of said elements being fixed to the block as against axial movement and the other being fixed to the body structure as against axial movement and one of said elements having an exposed manually rotatable portion providing upon rotation for sliding of the block with respect to the body structure.

References Cited

UNITED STATES PATENTS

| | | | |
|---|---|---|---|
| 2,152,877 | 4/1939 | Dagavarian | 32—63 |
| 3,237,307 | 3/1966 | Tofflemire | 32—63 |
| 3,305,928 | 2/1967 | Tofflemire | 32—63 |

ROBERT PESHOCK, Primary Examiner